Patented Oct. 6, 1953

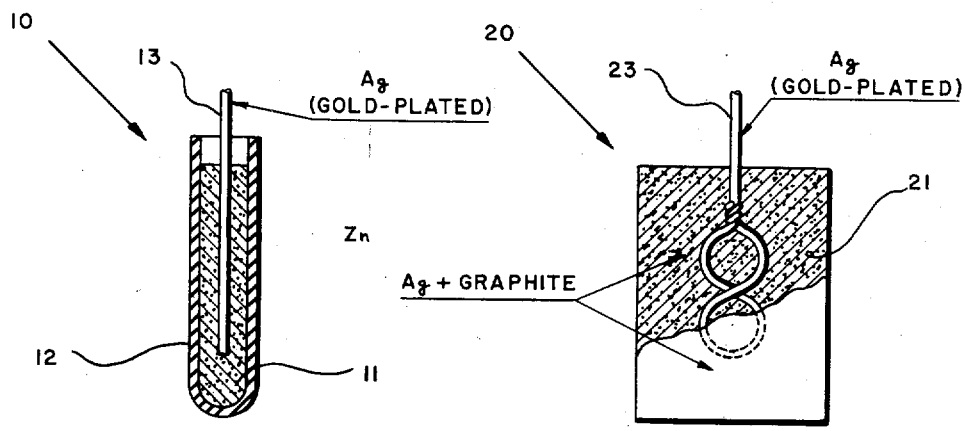
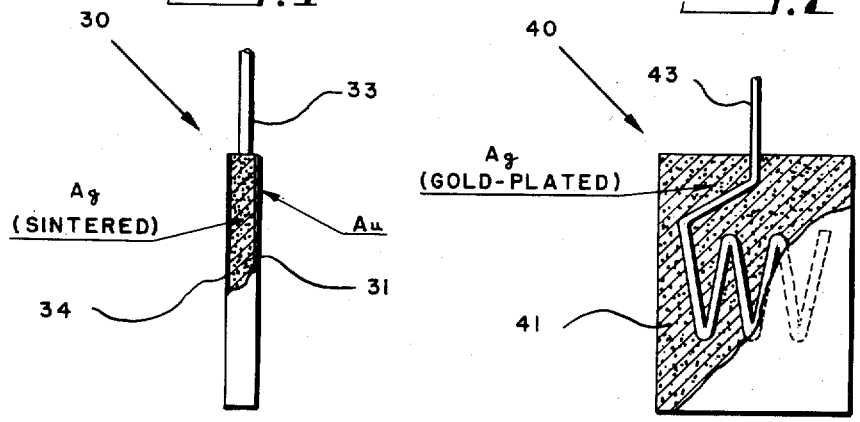

2,654,795

UNITED STATES PATENT OFFICE 2,654,795

ELECTRODE FOR ELECTRIC BATTERIES AND METHOD OF MAKING SAME

Otto H. Brill and Frank Solomon, New York, N. Y., assignors to Yardney International Corp., New York, N. Y., a corporation of New York Application November 14, 1951, Serial No. 256,199

7 Claims. (Cl. 136—120)

The present invention relates to electric batteries, rechargeable or other, and more particularly to batteries of the alkaline type comprising, preferably, one or more negative electrodes containing zinc and one or more positive electrodes containing silver.

It is an object of the present invention to provide, in a battery of this general description, a method of and means for improving the performance of either or both electrodes, or sets of electrodes, by enhancing the conductive contact between an electrode and its collector which, in a manner known per se, connects the active material of the electrode to its terminal.

Generally speaking, the foregoing object can be realized in accordance with the invention by introducing, between the active material of an electrode and the collector thereof, an agent of good conductivity which is not appreciably subject to oxidation or other chemical attack during normal functioning of the battery. This may be done in one of two ways: First, by juxtaposing the agent with the active material throughout at least a major portion of the electrode; secondly, by providing the collector within the electrode with a coating or sheathing of such agent. Both methods may, of course, be combined for best results.

Gold and other noble metals, such as platinum, palladium, rhodium and iridium, as well as graphite are substances found eminently suitable for the purpose described. While any of these substances when introduced between the active material of, for example, a silver electrode and the collector thereof, in the manner set forth above, will have the effect of improving the conductivity of the electrode (notably in the charged condition of the battery when at least a substantial part of the silver has been converted into a less highly conductive oxidation product), differences will exist between the modes of application preferred for certain of them. Thus the graphite may be admixed with the active material (e. g. silver powder) in powdered form so as to be distributed throughout the electrode body; the gold, on the other hand, which in view of its cost should be applied more sparingly, may be plated onto the active material and/or onto the collector (e. g. a silver wire) to form a thin layer thereon. Where the active material is comminuted silver which is subsequently consolidated by a sintering process, the gold plating may take place either before or after sintering. In the latter case the gold layer will be largely confined to the surface of the electrode; since, however, its good conductivity will cause current from many parts of the electrode to pass through this layer before reaching the collector, or vice versa, it will be understood that in this case, too, the conductive agent is inserted, electrically speaking, between the active material and the collector.

In carrying the invention into practice, care must be taken to maintain a suitable proportion between the conductive agent and the active material. If the ratio of conductive agent to active material is too low, the presence of the agent will be ineffective; if it is too high, then portions of the active material may be shunted out so as to result in a reduction of cell capacity. In general the proportion of the conductive agent should be not more than about 5% of the active material, by weight; in the case of gold, in particular, fractions of one percent have been found beneficial.

The invention will be described in greater detail with reference to certain embodiments, shown in the accompanying drawing in which:

Fig. 1 is a cross section through a negative electrode provided with a gold-plated collector according to the invention;

Fig. 2 is a front elevation, partly in section, of a positive electrode having an admixture of graphite and a gold-plated collector according to the invention;

Fig. 3 is a side elevation, partly in section, of a positive electrode gold-plated on its surface in accordance with the invention; and Fig. 4 is a view similar to Fig. 2, showing a positive electrode composed of gold-plated particles in accordance with the invention.

Fig. 1 shows a negative electrode generally indicated at 10 and comprising a mass of active material 11, here consisting of comminuted zinc, held in an electrolyte-permeable envelope 12 consisting, for example, of Cellophane. The usual lead or terminal connection comprises a wire 13 whose lower portion, imbedded in the zinc mass 11, represents a collector and may be given a shape similar, for example, to those shown in Figs. 2 and 4 for the purpose of increasing the area effectively in contact therewith.

In accordance with the invention the connection or lead 13, which is preferably a wire of highly conductive material such as silver, is coated, e. g. by plating, with a layer of attack-resistant conductive material, in this case gold. The gold surrounding the imbedded portion of the wire 13 forms a protective coating therearound which, for better protection, may extend also over part or all of the exposed upper portion of the wire.

In Fig. 2 there is shown a positive electrode 20 whose active material, indicated at 21, surrounds the lower part of the gold-plated collector wire 23 which serves the same purpose as the wire 13 of Fig. 1. The active material 21 here consists of a mixture of silver (oxidized at least in part to silver peroxide in the charged condition of the battery) and graphite, with the graphite present in a proportion preferably ranging from a fraction of one percent to five percent, by weight, of the silver. The optimum ratio will vary with the particle size of the graphite, larger particles (representing a smaller effective surface) calling for higher percentages by weight. As an example there may be mentioned an admixture of graphite of 5 micron particle size in an amount of ½% of the silver.

The active material 21 may be subjected to a sintering process, provided care is taken to prevent combustion of the admixed graphite. Suitable precautions may consist in using a sufficiently low sintering temperature, shortening the time of exposure in cases of higher temperatures, and/or providing an inert or reducing atmosphere (e. g. of carbon dioxide or of hydrogen) in which sintering is to be carried out.

The positive electrode 30 of Fig. 3 comprises a body of active material 31 consisting, essentially, of silver particles which have been sintered to form a rigid plate, the lead 33 (which may be gold-plated silver and similar in configuration to the lead 23 of Fig. 2) being imbedded in said plate. The body of sintered active material 31 is coated, e. g. by plating, with a layer 34 of gold applied thereto after the sintering process. The coating 34 covers the entire outer surface of the electrode body 31 and thus extends into contact with the lead 33; it will be understood that a major part of the current passing between said lead and parts of the active material 31 will (at least in the charged condition, when said material is oxidized and, therefore, less conductive) travel over the highly conductive layer 34 which, accordingly, can be regarded as electrically inserted serially between the silver and the wire 33.

Fig. 4 shows a positive electrode 40 comprising a body of active material 41 surrounding the lead 43 whose imbedded portion, of zigzag configuration, is functionally equivalent to the looped lower portion of lead 23 (Fig. 2). The body of electrode 40 differs from that of electrode 30 (Fig. 3) in that the comminuted silver particles themselves have been coated by a gold-plating process, in lieu of the surface coating of the finished plate shown at 34 in Fig. 3. The gold-plated particles 41 may or may not be sintered; while sintering may, to a certain extent, cause the gold to unite more intimately with the silver, it will not materially affect the general distribution of the gold throughout the electrode body 41.

It will be understood that the electrodes just described are only representative examples of electrodes embodying the invention and that the same may be modified in various ways without thereby departing from the scope of the invention as defined in the appended claims. Thus the principles of the invention may be extended to other types of electrodes, e. g. positive electrodes containing nickel or negative electrodes containing cadmium.

We claim:

1. An electrode for electric batteries, comprising an active material consisting essentially of silver, and a protective agent adjacent said active material selected from the group which consists of gold, platinum, palladium, rhodium and iridium.

2. An electrode for electric batteries, comprising an active material consisting essentially of silver, and a protective agent adjacent said active material selected from the group which consists of gold, platinum, palladium, rhodium and iridium, said protective agent being present in an amount not exceeding substantially 5%, by weight, of said active material.

3. An electrode for electric batteries, comprising an active material consisting essentially of silver and an admixture of gold in contact with said active material throughout at least a substantial portion of said electrode.

4. The method of improving the conductivity of an electrode for electric batteries, said electrode containing silver in comminuted form, which comprises gold-plating said silver.

5. The method of making an electrode for an electric battery which comprises sintering comminuted silver and gold-plating the sintered silver.

6. The method of making an electrode for an electric battery which comprises sintering a mixture of comminuted silver and gold.

7. The method of improving the conductivity of an electrode containing comminuted silver which comprises admixing gold with said silver.

OTTO H. BRILL.
FRANK SOLOMON.

References Cited in the file of this patent

UNITED STATES PATENTS

| Number | Name | Date |
|---|---|---|
| 727,117 | Edison | May 5, 1903 |
| 827,915 | Kitsee | Aug. 7, 1906 |
| 897,833 | Hubbell | Sept. 1, 1908 |
| 948,558 | Edison | Feb. 8, 1910 |
| 1,243,111 | Sanders | Oct. 16, 1917 |
| 1,884,166 | Otsuka et al. | Oct. 25, 1932 |
| 2,371,711 | Andre | Apr. 27, 1943 |

FOREIGN PATENTS

| Number | Country | Date |
|---|---|---|
| 757 of 1893 | Great Britain | Nov. 25, 1893 |
| 390,122 | Great Britain | June 22, 1931 |